United States Patent [19]
Hinnergardt et al.

[11] 3,732,727
[45] May 15, 1973

[54] METHOD AND APPARATUS FOR TESTING THE TENDERNESS OF MEAT

[75] Inventors: Larry C. Hinnergardt, Franklin; Justin M. Tuomy, Framingham, both of Mass.

[73] Assignee: The United States of America as represented by the Secretary of the Army, Washington, D.C.

[22] Filed: Dec. 7, 1971

[21] Appl. No.: 205,736

Related U.S. Application Data

[63] Continuation of Ser. No. 34,288, May 4, 1970, abandoned.

[52] U.S. Cl. ................................................73/81
[51] Int. Cl. ..........................G01n 3/42, G01n 33/12
[58] Field of Search ....................73/81, 78, 82–85

[56] References Cited

UNITED STATES PATENTS

| | | | |
|---|---|---|---|
| 3,636,757 | 1/1972 | Hansen | 73/81 |
| 3,593,572 | 7/1971 | Hansen | 73/81 |
| 3,602,038 | 8/1971 | Hansen | 73/81 |
| 3,308,654 | 3/1967 | Badgley | 73/81 |
| 2,446,956 | 8/1948 | Ross | 73/81 |

OTHER PUBLICATIONS

"Advances in Food Research", Vol. 14, edit. by Chichester et al., publ'ed Academic Press, N.Y. (1965)–call No. Tx, 53, A25–pp. 65–97; avail. Scientific Libr.–U.S. Patent Office "Proceedings, Meat Tenderness Symposium", 1963–pages 152–153 copy avail. in U.S. Pat. Off. Scientific Libr.–T5, 1960, M4, 1963.

*Primary Examiner*—James J. Gill
*Attorney*—Harry M. Saragovitz

[57] ABSTRACT

A method for testing the tenderness of a slice of meat comprising supporting the slice of meat in a horizontal plane, piercing the slice of meat with a plurality of semi-blunt needle-like piercing means, detecting the maximum force required for piercing the slice of meat, and recording the maximum piercing force on a strip chart in an electronic recorder/indicator.

Apparatus for carrying out the method including a means for driving a test member into a slice of meat, means for detecting and indicating the force applied in driving the test member into the slice of meat, the test member having a head portion comprising a plurality of semi-blunt elongated needle-like elements of small diameter and a plate-like base portion for supporting the slice of meat while the needle-like elements are being driven through the slice of meat and through holes in the plate-like base portion.

6 Claims, 3 Drawing Figures

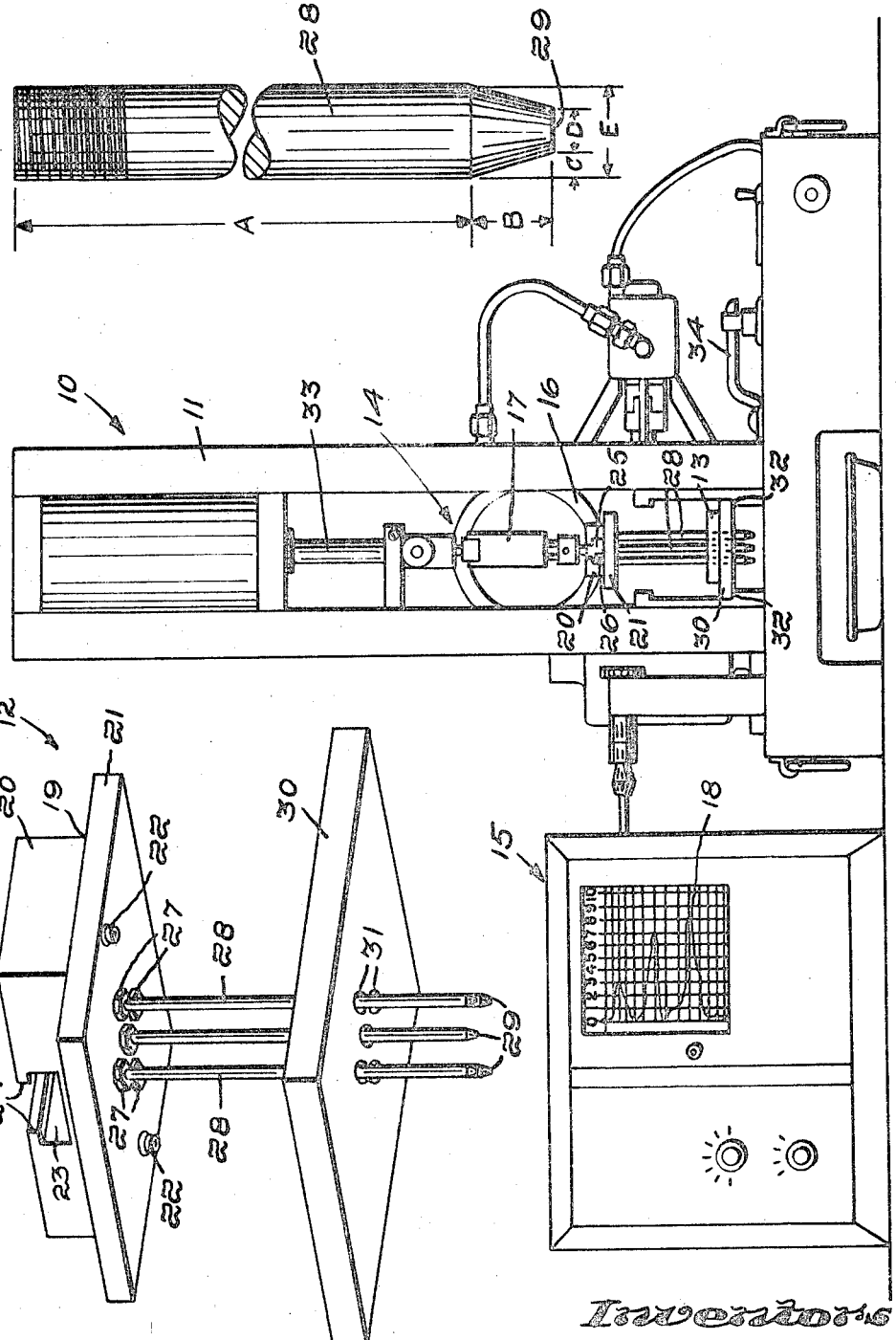

METHOD AND APPARATUS FOR TESTING THE TENDERNESS OF MEAT

This is a continuation of application Ser. No. 34,288, filed May 4, 1970 now abandoned.

The invention described herein may be manufactured, used, and licensed by or for the Government for governmental purposes without the payment to us of any royalty thereon.

This invention relates to a method and apparatus for testing the tenderness of a slice of meat without destroying the integrity of the slice of meat insofar as subsequent cooking and eating thereof are concerned. The invention relates more particularly to a method and apparatus for predicting the tenderness of cooked meat from the resistance of the uncooked meat to being pierced or penetrated by elongated needle-like piercing elements which do not destroy or seriously damage the meat during the testing thereof.

Numerous attempts have heretofore been made to develop test methods and testing apparatus for predicting the organoleptic tenderness of various types and cuts of meat. Some of these methods have involved the use of penetrometers which did not destroy the integrity of the meat. Some such penetrometers employed one or more sharp-pointed needle-like elements for penetrating the meat. Others employed blunt shafts or rods for either partially penetrating the meat or for punching through the meat. Such test methods have failed to produce a good correlation between the test results and the results of organoleptic tenderness testing of the meat after it has been cooked.

It is, therefore, an object of the invention to provide a method for nondestructively testing a slice of uncooked meat in such a manner as to predict the relative tenderness of the slice of meat after it has been cooked.

It is also an object of the invention to provide an apparatus for testing a slice of meat to determine the tenderness thereof and to predict the relative tenderness of the slice of meat after cooking thereof when the cooked meat is tested organoleptically by a technological taste panel.

Other objects and advantages will be apparent from the following description of the invention, and the novel features will be particularly pointed out hereinafter in connection with the appended claims.

In the accompanying drawing:

FIG. 1 is a front elevation of the apparatus of the invention for testing the tenderness of a slice of meat;

FIG. 2 is a perspective view of the improved test member of the invention viewed from a point below and to the right of the test member as it appears in FIG. 1, but separated from the hydraulic press of the apparatus; and FIG. 3 is an elevation of one of the semi-blunt needle-like elements of the test member, the main shaft of which is partially broken away.

In the embodiment of the invention illustrated in FIGS. 1–3, the apparatus for testing the tenderness of a slice of meat, generally designated by reference numeral 10, comprises a hydraulic press 11 for driving portions of a test member 12 into a slice of meat 13 and a force detecting means 14 and recording means 15 for detecting and indicating the force applied in driving the portions of the test member into and through the slice of meat.

The hydraulic press, the force detecting means, and the recording means are standard elements of an Allo-Kramer shear press, such as Model S2HE, manufactured by Food Technology Corporation. Operating instructions for the Allo-Kramer shear press are available from Food Technology Corporation.

The force detecting means 14 comprises an electronic proving ring 16 and an electronic transducer/amplifier 17; and the recording means 15 is a strip-chart electronic recorder/indicator, such as Model E2 Recorder Indicator, manufactured by Allo Precision Metals Engineering, Inc., which comprises a strip chart 18 on which the force that is detected by force detecting means 14 is recorded.

The novel element of the apparatus is the test member 12, illustrated in FIG. 2. The test member has a head portion 19 comprising an attaching block 20 and head plate 21, which is detachably fastened to the bottom of the attaching block 20 by means of two screws 22. Attaching block 20 has a slot 23 therein with overhanging flanges 24. Head portion 19 is detachably mounted on mounting head 25 which is attached to the bottom of proving ring 16 and fits into slot 23. Latch 26, which is mounted on the front of mounting head 25, holds the head portion 20 in place after it is attached to mounting head 25.

Head portion 19 has five spaced apart hexagon headed bolts 27 threadedly engaged in the bottom portion thereof. These bolts have an internally threaded hole in the center thereof in each of which a semi-blunt needle-like element 28 is threadedly engaged. Each needle-like element is tapered adjacent to its free end to form a land 29 on the free end which first contacts the top surface of a slice of meat which is being tested.

Test member 12 also has a plate-like base portion 30 which is generally rectangularly shaped and has five annular openings 31 passing therethrough from the top surface through the bottom surface of the base portion. The annular openings are of larger diameter than the external diameter of the needle-like elements; and one annular opening is substantially coaxial with each of the five needle-like elements so that the free ends of the needle-like elements will easily pass through the plate-like base portion. The base portion 30 is preferably made of a rigid plastic material and is supported by shelf-like indentations 32 in the hydraulic press; it in turn supports the slice of meat 13 during the testing thereof for tenderness. The slice of meat is free to be rotated or shifted slightly on base portion 30 after each piercing or penetration by the five needle-like elements so that the needle-like elements will not pierce the same holes in the slice of meat during successive piercings thereof. The movement of the hydraulic cylinder 33 of hydraulic press 11 is controlled by directional switch 34, which is capable of reversing the direction of movement of the hydraulic cylinder and the test member or of stopping the movement thereof at any predetermined point in the travel thereof.

The dimensions of the needle-like elements of the apparatus which have been found to be particularly effective for testing the tenderness of a slice of meat are as shown in Table 1.

TABLE 1

| Dimension | Size of Dimension in Inches |
|---|---|
| A | 5.25 |
| B | 0.125 |
|  | 0.033 |
| D | 0.059 |
| E | 0.125 |

The dimensions of the needle-like elements may be varied, but they must be maintained within limits which will permit the use of the needle-like elements with the particular driving means selected, such as the hydraulic press of the embodiment illustrated, and the force detecting and recording means selected for use. The dimensions shown in Table 1 are particularly suitable for needle-like elements used with the Allo-Kramer shear press, Model S2HE. Dimension A may be varied appreciably depending on the material of which the needle-like elements are constructed and the design of the driving means. The needle-like elements should not be so long as to result in the bending thereof during a tenderness test. Yet they must be long enough to penetrate through a slice of meat being tested for tenderness characteristics. If dimension E is made appreciably greater than 0.125 inches, the needle-like elements will make such large holes in the slice of meat that obtaining a good prediction of tenderness of the cooked meat based on the uncooked meat penetration force values will be precluded and further meaningful use of the slice of meat for technological taste panel evaluation will be prevented. Yet the needle-like elements must be of sufficient diameter not to bend when used repeatedly in piercing slices of meat to obtain time-force curves for testing tenderness. They also must be of sufficient diameter to permit formation of a land of appreciable diameter on the free end thereof so as to provide a semi-blunt needle-like piercing element. If the needle-like elements are too sharp at the free end, the correlation of the time-force peak values with the results of organoleptic testing is relatively poor.

The taper of the free end of the needle-like element, which is the slope of the needle-like element from the peripheral surface of the needle-like element to the peripheral edge of the land on the free end of the needle-like element, is defined as the ratio C:B, expressed in terms of inches per inch of length. For the preferred dimensions shown in Table 1 the value of the taper is 0.264 inches per inch of length. For acceptable results in predicting the tenderness of cooked meat in accordance with the invention, the ratio C:B may be varied between about 0.200 and about 0.500.

Generally speaking, it is desirable to select the needle-like elements of suitable length and diameter, the value of the diameter E being between about 0.110 and about 0.140 inches. The diameter of the land D is then selected at a value between about 0.055 and about 0.059 inches. Then having selected the value of the taper, C:B, as described above, the values of B and C follow from the values of E, D, and C:B.

The best results are obtained when the needle-like elements are spaced apart by a distance at least three times the diameter of the needle-like elements, that is at least 3E.

Having described the apparatus for testing the tenderness of a slice of meat, we will now proceed to describe the mode of operation of the apparatus in testing the tenderness of slices of meat.

Meat samples to be tested for tenderness may be prepared as follows:

1. The meat is stuffed into a 3½ inch artificial sausage casing and frozen. This procedure works well with the L. dorsi muscle of pork. However, large muscles, such as those found in beef carcasses, may be wrapped in freezer paper and frozen.

2. The frozen meat is sawed into 7/16 to 9/16 inch thick slices and pressed out to form approximately 2½ inch diameter slices. Insofar as possible, the sawing of the slices is conducted across the grain of the meat so that, when a slice of meat is supported by the base portion during a test, the needle-like piercing elements will move with their central axes parallel to the grain of the slice of meat as they pierce the meat. The slices of meat are wrapped in a moisture barrier material, such as aluminum foil, to maintain the identity of the individual slices and to minimize loss of moisture from the slices.

3. The slices of meat are stored in the frozen state until about 24 hours before being tested.

4. The approximately ½ inch thick slices are allowed to equilibrate with an ambient atmosphere of about 40° F., which usually requires about 18 to 20 hours.

Approximately 45 minutes before the piercing of the meat slices is to begin, the following steps are taken:

1. A 0–100 pound range electronic proving ring is installed in a Model S2HE Allo-Kramer Shear Press.

2. The attaching block 20 of a test member is attached to the proving ring by sliding slot 23 over mounting head 25 and locking it in place by means of latch 26.

3. The strip-chart electronic recorder/indicator 15 is allowed to warm up for approximately 30 minutes. The electronic proving ring 16 and the strip chart 18 are calibrated in accordance with directions in the Instruction Manual for Model E2 Recorder Indicator, prepared by Allo Precision Metals Engineering, Inc.

4. The plate-like base portion 30 is placed on shelf-like indentations 32 so as to cause the annular openings 31 to be coaxially aligned with the five needle-like elements 28.

When the apparatus is properly warmed and calibrated, the tenderness testing of the properly tempered meat slices is carried out as follows:

1. A slice of uncooked meat is placed on the plate-like base portion 30 so that all of the annular openings in the base portion are covered by the slice of meat.

2. The hydraulic cylinder 33 is started moving in a downward direction at a rate of 25 to 30 seconds for a full downstroke by means of directional switch 34. The five needle-like elements 28 mounted on head portion 19 are moved downwardly by the downward motion of the hydraulic cylinder and caused to pierce the slice of meat. The free ends of the needle-like elements pass through the slice of meat and into and through annular openings 31 in the base portion until they reach the end of the downward stroke. The force required for the needle-like elements to pierce the slice of meat causes a slight deflection of the electronic proving ring 16, which is transformed by the electronic tranducer/amplifier 17 into electrical energy, which is recorded on strip chart 18 of the electronic recorder/indicator as a time-force curve. When the needle-like elements are allowed to continue in a downward direction through the complete downstroke, the entire time-force curve is recorded. However, if one is only interested in the peak values is the time-force curve, as is generally the case for tenderness testing, the downstroke may be stopped by means of directional switch 34 as soon as the needle-like elements can be felt emerging from the bottoms of the annular openings in the base portion, using the fingers of one hand to detect this while operating the directional switch with the other hand.

3. The needle-like elements are withdrawn from the slice of meat by reversing the stroke of the hydraulic cylinder by reversal of the directional switch.

4. When the needle-like elements have reached the top of their stroke, the slice of meat is rotated slightly or shifted slightly on the base portion so as to avoid having the needle-like elements pierce the same holes in the meat on the next downstroke of the needle-like elements.

5. The above steps are repeated two more times on the same slice of meat to provide three time-force curves and, therefore, three peak force values, which are averaged to give a peak force value average which is used to indicate the tenderness characteristic of that particular slice of meat and to predict the tenderness which the slice of meat will exhibit after it is cooked.

The slice of meat, following the three piercings thereof by the needle-like elements may be cooked in a standardized manner for the purpose of conducting organoleptic testing of tenderness by means of technological taste panel evaluation. The standardized cooking procedure is as follows:

1. Allow the slice of meat to warm to room temperature (60° to 70° F.) before cooking.
2. Wrap the slice of meat in foil, place in an aluminum pan, and cover with aluminum foil. Then cook in a steam chamber at 6 psi until an internal temperature of 160° F. to 200° F., preferably about 180°F., is attained.
3. Allow the cooked slice of meat to cool to about 40° F. if it is desired to run a tenderness test on the cooked meat, similar to the needle-like element piercing test run on the uncooked meat, before subjecting the cooked meat to organoleptic testing.

The following examples of the testing of slices of different meat samples show how well the testing of tenderness with the apparatus of the invention correlates with organoleptic testing, which is the ultimate criterion of the tenderness of a slice of cooked meat.

EXAMPLE I

Longissimus dorsi muscle of fresh pork loin was stuffed into a 3½ inch artificial casing, was frozen, and was then sawed across the grain of the pork loin muscle into approximately ½ inch thick pork chops. This was done with five separate pork loins. The pork chops were then cut into 2½ inch diameter chops with a drill press and circular cutter. The chops to be tested for tenderness were selected from the pork loin immediately posterior to the eighth thoracic vertebrae. Each pork chop selected for tenderness testing was penetrated three times with the five needle-like elements of the above-described apparatus in the uncooked state, the needle-like elements moving substantially parallel to the grain of the meat, and the peak penetration force in pounds was determined. The average of each set of three peak penetration force values for the raw pork chops is shown in Table 2. The pork chops were steam cooked, as described above, to an internal temperature of about 180° F. The pork chops were then penetrated again after having been cooked and the averages of three penetration force values for each of the cooked pork chops are also shown in Table 2. The cooked pork chops were then subjected to technological taste panel testing and the average rating on a scale from 1 to 9 by 10 panel members is shown in Table 2 for each pork chop. The higher the taste panel evaluation average, the more tender the pork chop. Also, the lower the penetration force, the higher the indicated tenderness of the pork chop.

TABLE 2

| Pork Loin Number | Penetration Force (in lbs.) (Uncooked Pork Chops) | Penetration Force (in lbs.) (Steam Cooked Pork Chops) | Technological Taste Panel Evaluation for Tenderness |
|---|---|---|---|
| 2 | 1.28 | 6.05 | 8.0 |
| 28 | 1.91 | 7.32 | 7.4 |
| 15 | 3.26 | 9.46 | 6.4 |
| 21 | 3.62 | 12.40 | 4.3 |
| 27 | 3.90 | 14.28 | 2.9 |

It is seen that a good correlation exists between the penetration force required for raw pork chops, using the apparatus of the invention, and the degree of tenderness of the cooked pork chops as evaluated by a technological taste panel of ten expert tenderness testers.

EXAMPLE II

Different muscles of beef steak, as shown in Table 3, were wrapped in freezer paper, carefully laid in a freezer to maintain the shape of the muscle, frozen, and then sawed into approximately ½ inch thick steaks, the steak being sawed substantially across the grain. The steaks were then cut into 2½ inch diameter steaks with a drill press and circular cutter. Each uncooked steak to be tested for tenderness was penetrated three times with the five needle-like elements of the above-described apparatus moving substantially parallel to the grain of the steak and the peak penetration force was determined. The average of the three peak penetration force values for each uncooked steak is shown in Table 3. The steaks were steam cooked as described above to an internal temperature of about 180° F. The steaks were then penetrated again, after having been cooked, and the averages of three peak penetration force values for each of the cooked steaks are also shown in Table 3. The cooked steaks were then subjected to technological taste panel testing and the average rating on a scale from 1 to 9 by 10 panel members is shown in Table 3 for each steak. The higher the taste panel evaluation average, the more tender the steak. Also, the lower the value of the peak penetration force, the higher the indicated tenderness of the steak.

TABLE 3

| | Penetration Force (in lbs.) (Uncooked Beef Steak) | Penetration Force (in lbs.) (Steam Cooked Beef Steak) | Technological Taste Panel Evaluation for Tenderness |
|---|---|---|---|
| Longissimus dorsi | 2.37 | 7.43 | 7.0 |
| Longissimus dorsi | 2.63 | 8.93 | 6.4 |
| Longissimus dorsi | 3.77 | 8.60 | 5.8 |
| Semitendinosus | 3.48 | 10.73 | 4.6 |
| Semitendinosus | 6.07 | 13.13 | 3.8 |
| Biceps femoris | 5.83 | 12.53 | 4.4 |
| Biceps femoris | 6.58 | 11.60 | 3.8 |
| Semimembranosus | 3.73 | 9.50 | 4.3 |
| Semimembranosus | 4.33 | 13.03 | 3.5 |
| Adductor | 3.90 | 12.67 | 3.8 |
| Adductor | 4.13 | 13.20 | 3.4 |

It is seen that a reasonably good correlation exists between the peak penetration force required for raw beef steaks, using the apparatus of the invention, and the degree of tenderness of the cooked beef steaks as evaluated by a technological taste panel of ten expert tenderness testers.

Although in the embodiment of the invention described and illustrated herein, the means for driving the test member is a hydraulic press, it is to be understood that other types of driving means may be employed, e.g., electrical driving means or spring-loaded driving means.

It is also to be understood that in the test member of the invention the number of elongated needle-like piercing elements may be fewer than five or more than five. A plurality of these piercing elements integrates the force involved in piercing the slice of meat being tested for tenderness. Integration of the force over a plurality of needle-like elements results in an improved correlation between the average maximum force required to pierce the uncooked slice of meat and the average technological panel tenderness rating for the cooked slice of meat. Employing needle-like elements having the proper degree of bluntness and the proper diameter is very important to the success of the apparatus and method of the invention in comparison with prior art attempts to correlate the tenderness of cooked meat with penetrometer tests on the uncooked meat.

The penetration force test results provide a reasonably good approximation of tenderness for a given type of muscle, but not an absolute indication with respect to any and all beef muscles. Likewise, it does not provide an absolute comparison of the tenderness of two or more different types of meat, such as beef steaks, as in Example II, and pork loin chops, as in Example I.

The present invention is useful in testing fresh, uncooked meat to determine how tender it will be after being cooked by a standardized cooking procedure and then being tested organoleptically. It is well-known that meat may be toughened or otherwise made less desirable by subjecting it to improper cooking procedures. No method of testing is capable of predicting the tenderness of a cooked meat under all cooking conditions. However, the method and apparatus of the present invention have been found to be much more dependable for the prediction of the tenderness of cooked meat than any prior method of predicting the tenderness of cooked meat from characteristics of the uncooked meat. Another advantage of the present invention is that the slices of meat used in testing for tenderness are not destroyed in the testing thereof. They can be cooked and eaten after having been tested in the uncooked condition. They may also be tested in the same manner using the apparatus of the invention after having been cooked, if desired.

The method and apparatus of the invention will be very useful in developing improved methods of cooking meats since the test of tenderness in accordance with the invention can also be applied to the cooked slices of meat after testing of the slices in the uncooked state and cooking thereof. Use of the tenderness testing apparatus and method of the invention on the cooked meat as well as the uncooked meat will speed up testing by eliminating or minimizing the need for organoleptic testing, thus permitting rapid screening of variations in uncooked meat requiring variations in cooking procedures for optimal usage.

The apparatus and method of the invention will also be useful in developing improved methods for the freeze dehydration of meats since they will indicate favorable or unfavorable effects of freeze dehydration processing conditions on the tenderness of cooked reconstituted meat products.

It will be understood, of course, that various changes in the details, materials and arrangements of parts which have been herein described and illustrated in order to explain the nature of the invention, may be made by those skilled in the art within the principle and scope of the invention.

We claim:

1. In a process for testing a raw meat to determine how tender it will be after cooking, the steps of pressing a plurality of substantially parallel, semi-blunt, needle-like piercing means substantially through a piece of said raw meat which is held firmly in its original form against substantial distortion during penetration, each of said needle-like piercing means having a circular land on its free end having a diameter of from about 0.055 to about 0.059 inches and having a taper at its free end of from about 0.200 to about 0.500, and recording as the indication of tenderness the resistance encountered by the piercing means during travel thereof through said raw meat.

2. A process according to claim 1, wherein in said step of pressing a plurality of substantially parallel, semi-blunt, needle-like piercing means substantially through a piece of raw meat which is held firmly in its original form against substantial distortion during penetration, said plurality of needle-like piercing means are moved with the central axes thereof substantially parallel to the grain of said raw meat.

3. A process according to claim 1, wherein in said step of pressing a plurality of substantially parallel semi-blunt, needle-like piercing means substantially through a piece of raw meat which is held firmly in its original form against substantial distortion during penetration, said plurality of piercing means are spaced apart a distance at least three times the diameter of said piercing means.

4. A process according to claim 1, wherein in said step of pressing a plurality of substantially parallel, semi-blunt, needle-like piercing means substantially through a piece of raw meat which is held firmly in its original form against substantial distortion during penetration said piece of raw meat is in the form of a slice of substantially uniform thickness, said slice is held in a substantially horizontal plane, and the grain of said slice is substantially perpendicular to said horizontal plane.

5. A process according to claim 4, wherein in said step of pressing a plurality of substantially parallel, semi-blunt, needle-like piercing means substantially through a piece of raw meat which is held firmly in its original form against substantial distortion during penetration said piercing means are moved with the central axes thereof substantially parallel to the grain of said slice of raw meat and substantially perpendicular to said horizontal plane.

6. A process according to claim 1, wherein in said step of pressing a plurality of substantially parallel, semi-blunt, needle-like piercing means substantially through a piece of raw meat which is held firmly in its original form against substantial distortion during penetration each of said needle-like piercing means has a diameter of between about 0.110 and about 0.140 inches.

* * * * *